(12) United States Patent
Selgert

(10) Patent No.: US 8,259,614 B2
(45) Date of Patent: Sep. 4, 2012

(54) PERSONAL NETWORK, AND METHOD TO SECURE A PERSONAL NETWORK

(75) Inventor: Franklin Selgert, Berkel En Rodenrijs (NL)

(73) Assignee: Koninklijke KPN N.V., The Hague (NL)

( * ) Notice: Subject to any disclaimer, the term of this patent is extended or adjusted under 35 U.S.C. 154(b) by 850 days.

(21) Appl. No.: 12/074,713

(22) Filed: Mar. 5, 2008

(65) Prior Publication Data

US 2008/0225813 A1 Sep. 18, 2008

(30) Foreign Application Priority Data

Mar. 6, 2007 (EP) ..................... 07004551

(51) Int. Cl.
*H04L 12/28* (2006.01)
(52) U.S. Cl. .................. 370/254; 370/338; 709/226
(58) Field of Classification Search .................. 370/254, 370/338; 726/3, 7; 709/226
See application file for complete search history.

(56) References Cited

U.S. PATENT DOCUMENTS

| 2006/0224742 | A1 | 10/2006 | Shahbazi | |
|---|---|---|---|---|
| 2009/0210532 | A1* | 8/2009 | Lim et al. ..................... | 709/226 |
| 2009/0222566 | A1* | 9/2009 | Murakami ..................... | 709/229 |
| 2010/0229229 | A1* | 9/2010 | Kumar et al. ..................... | 726/7 |

OTHER PUBLICATIONS

I.G. Niemegeers et al, "From Personal Area Networks to Personal Networks: A User Oriented Approach", Wireless Personal Communications, vol. 26, pp. 175-186 (2002).
Den Hartog, Frank et al., "Personal Networks Enabling Remote Assistance for Medical Emergency Teams", Journal on Information Technology in Healthcare, vol. 3, No. 6, 2005, pp. 377-385 (this is identical to the paper in "Studies in Health Technology and Informatics", referred to in paragraph 3 of the applicant's Specification).

* cited by examiner

*Primary Examiner* — Albert T Chou
(74) *Attorney, Agent, or Firm* — McDonnell Boehnen Hulbert & Berghoff LLP

(57) ABSTRACT

A personal network, being associated with a user, and a method for securing it are disclosed. The personal network has a plurality of personal devices associated with the user, wherein the personal devices are configured to be interconnected with each other via one or more communication connections, to allow data communication there between; and at least one personal network control unit and/or service configured to control access to the personal network. The control unit and/or service is operable to be in a first mode that allows all of the personal devices to access the personal network, and a second mode wherein at least one of the personal devices has restricted or no access to the personal network.

18 Claims, 1 Drawing Sheet

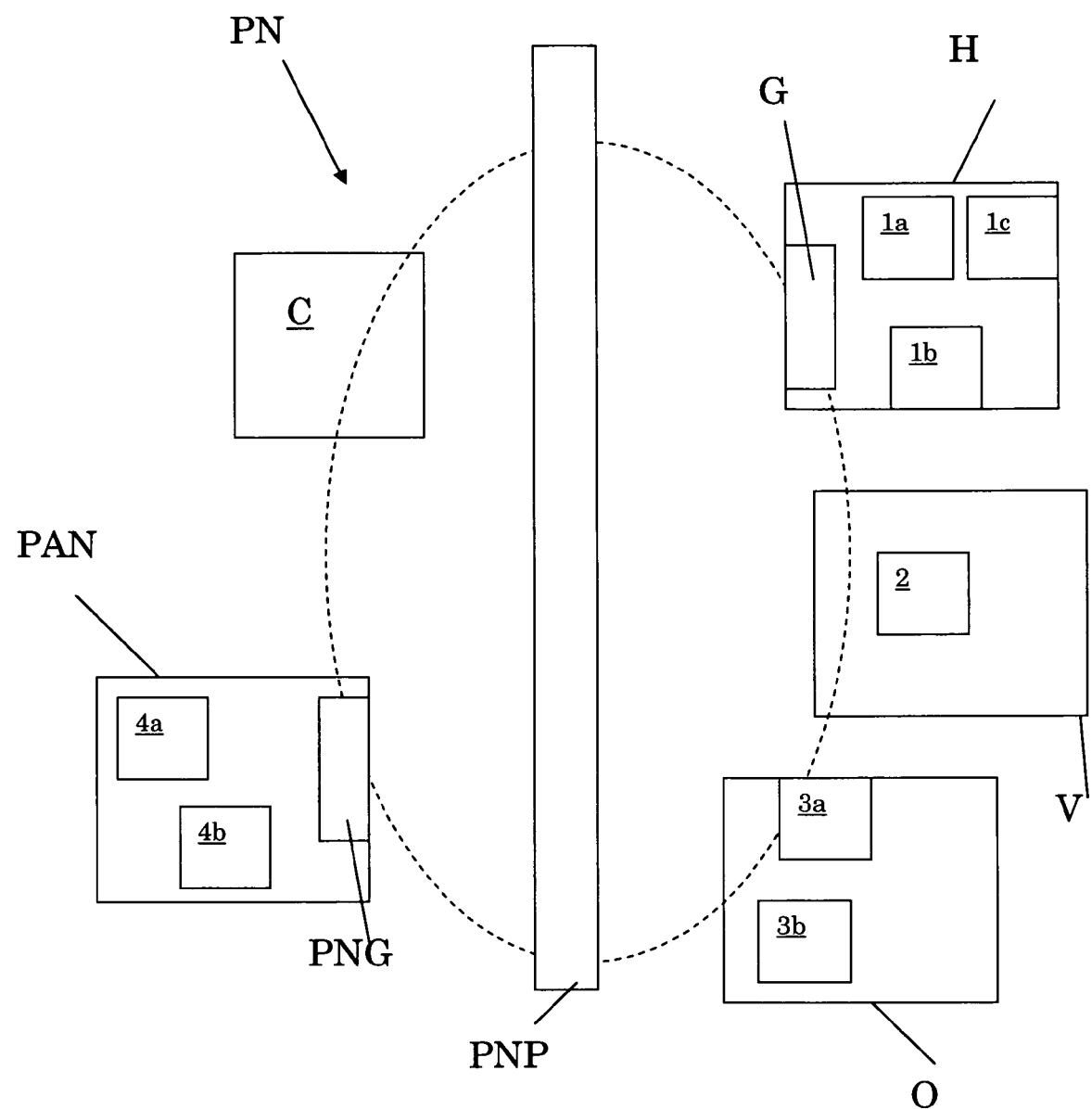

PERSONAL NETWORK, AND METHOD TO SECURE A PERSONAL NETWORK

FIELD OF THE INVENTION

The invention relates to a personal network, being associated with a user, the personal network a plurality of personal devices associated with the user, wherein the personal devices are configured to be interconnected with each other via one or more communication connections, to allow data communication there between.

As described in "Personal Networks Enabling Remote Assistance for Medical Emergency Teams", by F. T. H. den Hartog, J. R. Schmidt, and A. de Vries, in Studies in Health Technology and Informatics, Volume 114, 2005, Pages 221-229, a Personal Area Network (PAN) can be defined as a network of devices in a personal operating space of the user. The user is, for instance, carrying a laptop, a PDA, a mobile phone, a wireless headset and a digital camera. The devices are, for instance, networked with each other by means of high-data-rate WPAN technology (>200 kbps). The mobile phone, the laptop and the PDA can also communicate to the rest of the world by means of Universal Mobile Telecommunications System (UMTS) technology or Wireless Local Area Network (WLAN) technology. This configuration enables, e.g., pictures taken by the digital camera to be emailed by means of an email client on the PDA and the UMTS connection of the mobile phone.

A Personal Network PN (not to be confused with a PAN), is envisaged as the next step in achieving unlimited communication between people's electronic personal devices. A PN provides the technology needed to interconnect the various private networks of a single user seamlessly, at any time and at any place. Such private networks are PANs, home networks, car networks, company networks, and others. Often, a user wants to remotely access content, applications, or resources that are located in one of his private domains. For example, a businessman who is at a conference wants to take pictures of various demonstrators without having to worry where the pictures should be stored: on the memory card of the camera, the hard disc of the laptop, the content server in the office, or the desktop computer at home. A PN should solve the current limitations that inhibit (user-friendly) access to the personal devices that are not physically close to the user at the moment of need.

Various private and public infrastructures are involved in creating a PN. The PN itself is covering the multiple domains that should hide the underlying network and business complexity from the user.

At the heart of the PN can be a core-PAN, which is physically associated with the owner of the PN. The core-PAN consists of one or more networked personal devices carried by the user. Depending on the location of the user, the core-PAN can interact with devices in its direct environment or with remote devices in the user's other private networks to create a PN. A key element of the core-PAN can be a PN Gateway (PNG). Another important factor for enabling a fully functional PN can be the Personal Network Provider (PNP). The PNP is not a device or a specific application, but a new business role. It is basically the service provider offering the PN service and providing an operational environment to manage user, service, content and network related issues.

A main objective and advantage of the personal network is that the personal devices, that are associated with an individual user, can—preferably seamlessly—interconnect and communicate with each other, providing above-described advantages. The user can preferably access any of his personal devices, anywhere, using data communication via the respective personal network.

SUMMARY OF THE INVENTION

An innovative notion underlying the present invention is, that the above-mentioned advantage of the known personal network has the undesired result, that anybody who has control over one of the personal devices of a user can access other personal devices of the user as well, via the personal network. For example, one of the personal devices that is associated with a user can be stolen, and be used subsequently to illegally access other personal devices of the same user, for example to illegally obtain personal information from those personal devices or even to illegally take over control of those personal devices.

According to an embodiment of the invention, this problem is solved by an improved personal network, having at least one personal network control unit and/or service configured to control access to the personal network, wherein the personal network control unit and/or service is operable to be in at least a first mode to allow (normal) access of all of the personal devices to the personal network, and a second mode to restrict the access of at least one of the personal devices to the personal network.

For example, the personal network can be provided by a personalized network overlay over multiple network domains, for example private and/or public infrastructures, wherein the personalized network overlay can include a security service to provide a first and a second personal network security mode. Thus, the control unit can be part of the personalized network overlay, and be provided by the mentioned security service.

For example, a normal access to the personal network can mean, that the respective personal device can access all other personal devices of the personal network. On the other hand, a restricted access can mean that the respective personal device is restricted to access (or even denied to access) other personal devices of the personal network.

In an embodiment, the restriction can include that the respective personal device, which has restricted access, can still communicate to some extent with other personal devices, for example to transmit a location and/or status information to other personal network components. For example, the restriction can involve that the respective device, having restricted personal network access, can no longer read information from other personal devices of the user and can not control the other personal devices anymore in case such control is available when the control unit and/or service is in the first mode.

Besides, a further embodiment provides that the control unit and/or service completely blocks access of at least one of the personal devices to the personal network, when the control unit and/or service is in its second mode.

Also, in an embodiment, the control unit and/or service can restrict access of all of the personal devices to the personal network, when the control unit and/or service is in its second mode. This can provide a very high level of security, particularly in the case the restriction involves blocking any personal network access to any of the personal devices.

According to a further embodiment, the personal network control unit and/or service comprises a gateway device, or can be reached via a gateway device, the gateway device being configured to provide access to the personal network via an external communication network.

According to a preferred embodiment, the control unit and/or service is configured to receive a control message from the user, and to change from the first mode to the second mode due to receiving the control message. For example, the control message can include certain login information, a user identification, a password, a pincode, and/of other information, that can be used by the control unit and/or service to verify the authenticity of a received control message. According to a further embodiment, the control unit and/or service can be connected to an external communication network, for example a telephone network, such that the control message can be transmitted to the unit and/or service via that network. For example, the user can simply call the control unit and/or service (via the telephone network, using an appropriate telephone number) of his personal network, to transmit the control message.

Besides, at least one of the personal devices can be selected from the group:
- a personal device being part of a Personal Area Network that is spatially associated with the user during operation;
- a personal device that located in a building that is associated with the user; and
- at least part of a personal transport apparatus that is associated with the user.

Preferably, at least one of the personal devices of the PN is a PAN domain device, and at least one other of the personal devices of the PN is selected from another domain (for example building and/or transport apparatus) of the personal network.

The present invention also provides a method to secure a personal network of a user, the method including:
- providing the personal network, the personal network comprising a plurality of personal devices associated with the user, wherein the personal devices are configured to be interconnected with each other via one or more communication connections, to allow data communication there between;
- providing a first personal network security mode, in which all of the personal devices have access to the personal network; and
- providing a second personal network security mode, in which the access of at least one of the personal devices to the personal network is being restricted.

Thus, the network can be secured, to prevent that at least one of the personal devices, for example a stolen device, is used for any undesired network activities.

For example, during use, the user detects a loss of at least one of his personal devices, and subsequently operates his personal network to be in its second personal network security mode, such that the one or more lost devices only have the restricted access, or no access at all, to the personal network.

Also, the invention provides software comprising machine executable instructions, for example computer code, configured to carry out a method according to the invention when executed by a machine.

Further advantageous embodiments of the invention are described in the dependent claims. These and other aspects of the invention will be apparent from and elucidated with reference to non-limiting embodiments described hereafter, shown in the drawing.

BRIEF DESCRIPTION OF THE DRAWING

FIG. 1 schematically depicts a system according to an embodiment of the invention.

DETAILED DESCRIPTION

Similar or corresponding features are denoted by similar or corresponding reference signs in the present patent application.

FIG. 1 schematically depicts a personal network PN. The network is associated with a single user (not shown as such), and comprises a plurality of personal devices 1, 2, 3, 4 associated with the user. In the personal network, PN, the personal devices 1, 2, 3, 4 are seamlessly interconnected with each other, for example via one or more communication connections and by the application of a certain personalized network overlay (see below), to allow datacommunication there between.

The one or more communication connections can be provided by various types of network infrastructures and network types, for example one or more wireless network connections, radiofrequency communication connections, particularly wireless Ethernet or local area network (LAN) links, connections according to the IEEE802.11 standard, for example a Wireless Fidelity (WIFI) communication connection, infrared light transmission communication, and/or a Bluetooth communication connections. Alternatively, wired local communication links can be provided, for example a local USB link, firewire (IEEE 1394), or wired Ethernet link. The one or more network connections preferably include a wide area network, particularly Internet, a telephone network, cellular network, and also one or more Bluetooth networks and/or other network infrastructures and network types, as will be appreciated by the skilled person. The personal network PN can consist of internet protocol (IP) domains, but can also comprise non-IP domains. Examples of non-IP domains are car networks V and PANs that make use of Bluetooth.

For example, in the present embodiment, the personal network PN can be a personalized virtual overlay over multiple network domains, for example private and/or public infrastructures H, V, O, PAN.

Also, in other words, in an embodiment, the personal network PN can be an overlay network, overlaying multiple network domains H, V, O, PAN, which entails access for various personal devices to a private address range behind a gateway (for example a home gateway).

For example, the personal network PN can include a home network H, that is physically associated with a residence, home or building relating to the user. The home network H can include one or more of the personal devices 1 (three devices 1a, 1b, 1c being shown schematically), for example a personal computer, media-recorder, consumer appliances, telephone device 1a (for example: a telephone device including computer network functionality or a modem containing device), and/or other devices. Besides, for example, the home network H can include a residential (home) gateway G to provide access to the personal devices 1a, 1b, 1c of the home network H via an external communication network (for example a telephone and/or cellular network).

The personal network PN can also include one or more personal devices 2 that are part of a personal transport apparatus, for example a car network V, that is associated with the user, for example a vehicle computer system, a navigation device. In the present embodiment, a further part of the personal network, relating to the same user, can include one or more personal devices 3 (3a, 3b) that are located in an office building that is associated with the user, for example devices 3 of a corporate network O.

Besides, there can be provided a Personal Area Network PAN (see above), that is spatially associated with the user during operation, the PAN comprising one or more of the personal devices 4 (4a, 4b), for example a cellular phone, laptop, PDA, headset, multimedia-player and/or other preferably portable devices. Particularly, the PAN can be provided by or include one or more portable devices 4 that are actually carried by the user.

Each of the personal devices 1, 2, 3, 4 can include one or more network communication means, processors, computers, a memory, data interfaces, network adapters, software code, user interfaces (for example keyboard, touch-screen, and/or speech interface), and/or other components, depending on the type of device 1, 2, 3, 4, as will be appreciated by the skilled person.

As follows from the above, various private and public infrastructures H, V, O, PAN can be involved in creating the personal network PN. The PN itself is covering the multiple domains that should hide the underlying network and business complexity from the user.

In a further embodiment, the PAN can provide a heart of the PN (in which case the PAN is a "a core-PAN"), the PAN being physically associated with the owner of the PN. In FIG. 1 the core-PAN consists of one or more networked personal devices 4 carried by the user. Depending on the location of the user, the core-PAN can interact with devices in its direct environment or with remote devices 1, 2, 3 in the user's other private networks to create a PN.

In the present embodiment, one element of the core-PAN can be a personal network Gateway (PNG). The PNG can be configured to provide the functionality needed to create the PN from the core-PAN and the other private (remote) networks H, V, O. This functionality might include, amongst others, local storage, local intelligence, multiple wireless (mobile) access network interfaces, and protocol bridging/proxying functionality. The PNG can be a single dedicated device, or added functionality of other devices in the core-PAN. In the example of the PAN as described before, the PNG functionality can be distributed over the laptop, PDA, and mobile phone.

In an alternative embodiment, another part of the personal network can provide a heart of the PN. For example, the residential gateway G can be configured to provide the functionality needed to create the PN from the PAN and the other personal network parts H, V, O.

Besides, the personal network PN preferably comprises an above-mentioned Personal Network Provider (PNP). The PNP is basically the service provider offering the PN service and providing an operational environment to manage user, service, content and network related issues. For example, the PNP can be configured to provide the above-mentioned personalized network overlay.

The PNP might use a service platform, which preferably communicates with the PNG and offers service control functions that enable the end user to easily gain and maintain access to services, while roaming between different interconnecting public infrastructures. For other service providers, the PNP can act as a one-stop shop for providing their services to the PN. The PNP could also take care of the billing, depending on the subscriptions with the various network and service providers, and on the authentication of the devices and content belonging to the PN. Preferably, one of the services that can be accessible by the end user via the PNP service platform is the above-mentioned security service.

For example, according to a preferred embodiment, there is provided at least one personal network control unit C (or network security service, or a control unit including a network security service) configured to control access to the personal network PN, wherein the control unit C is operable to be in at least a first security mode to allow access of all of the personal devices 1, 2, 3, 4 to the personal network PN, and a second security mode to restrict the access of at least one of the personal devices 1, 2, 3, 4 to the personal network PN. The control unit can be a security unit, that can provide a desired security to the personal network, particularly to restrict or deny access to the personal network in a certain manner (see below) in the case that at least one of the personal devices 1, 2, 3, 4 has become lost or stolen.

In FIG. 1, the control unit C is simply depicted as a separate element. However, preferably, in practice, the control unit or at least its functionality can be embedded in on or more of the abovementioned parts of the personal network. For example, at least part of the control unit can be embedded in or be provided by at least a gateway, for example the mentioned personal network gateway PNG and/or home gateway G and/or another gateway. For example, in a further embodiment, the personal network control unit C comprises a gateway device G, PNG, or can be reached via a gateway device, the gateway device being configured to provide access to the personal network via an external communication network.

Preferably, the control unit (i.e., its functionality) is embedded at least partly in the above-mentioned Personal Network Provider (PNP). For example, in the present embodiment, the control unit can consist of or be provided by a security service of the personal network PN, that is included in the above-mentioned personalized overlay over the multiple network domains H, V, O, PAN (in other words: the personalized network overlay can preferably include a security service, particularly to provide first and second personal network security modes). Also, each of the personal devices 1, 2, 3, 4 can be provided with functionality of the control unit.

The control unit C can be provided by suitable hardware and software, configured to execute the control unit's functionality during operation. There can be provided software comprising machine executable instructions, for example computer code, configured to carry out the control unit's functionality when the code is being executed by a machine (i.e., by hardware). Besides, there can be provided a data carrier or a processor or computer readable medium, the carrier or medium including the control unit software or control unit computer instructions.

The control unit C can consist of or provide a personal network access restriction service (or a personal network access denial service), that is preferably controllable by the user if desired. The personal network access restriction service (or a personal network access denial service) can preferably regulate and adjust access to the personal network PN for each of the personal devices 1, 2, 3, 4. In a further embodiment, the personal network access restriction service (or a personal network access denial service) can preferably regulate and adjust access to the personal network PN for each of the separate personal network domains H, V, O, PAN separately.

According to a preferred embodiment, the control unit C (i.e., personal network access restriction/denial service) is configured to receive a control message from the user, and to change from the first mode to the second mode due to receiving the control message.

Also, in the present embodiment, the control unit C is preferably connected to an external communication network, for example a telephone network and/or cellular network, such that the control message can be transmitted to the unit C via that network. For example the control unit C can include an abovementioned telephone device 1a, or be communicatively connected thereto (via the personal network PN), for receiving incoming telephone calls comprising control messages.

The control unit C can be configured to completely blocks access of (i.e., denies access to) at least one of the personal devices 1, 2, 3, 4 to the personal network PN, when the control unit is in its second mode. For example, the control unit C can be controlled or operated to select which of these devices 1, 2, 3, 4 is to have such a restricted access. Also, as has been mentioned above, according to an embodiment, the control unit C can be configured to restrict (preferably block) access of all of the personal devices 1, 2, 3, 4 to the personal network PN, when the control unit is in its second mode.

During operation of the system shown in FIG. 1, there can be provided a method to secure the personal network PN of the user. The method can include: providing a first personal network security mode, when the control unit C is in its first mode, such that the personal devices 1, 2, 3, 4 all have normal access to the personal network PN (i.e., can access each other via suitable communication connections).

In the case that one or more of the personal devices 1, 2, 3, 4 is lost, for example in the case that a personal vehicle comprising the vehicle network V and its respective devices 2 has been stolen, and the user has detected that he/she has lost the personal network part V, 2, the user can preferably immediately operate his (her) personal network PN to be in a second personal network security mode, such that the one or more lost devices 2 only have the restricted access, or preferably no access at all, to the personal network PN.

Preferably, the control unit C can be operated to be in its second mode, for providing a second personal network security mode, particularly after the first mode, in which the access of the lost personal devices 2 to the personal network PN is being restricted.

If desired, the access of the stolen or lost personal devices 2 to the personal network PN is being completely blocked during the second personal network security mode, such that the stolen or lost device 2 can not be used for any malpractice regarding a remaining part 1, 3, 4 of the personal network PN. Thus, the user can continue using the remaining part 1, 3, 4 of the personal network PN in a substantially normal manner.

Also, in a further embodiment, during operation, the access of all of the personal devices 1, 2, 3, 4 to the personal network PN is being completely blocked during the second personal network security mode, to provide best security.

The user of the lost personal devices 2 can preferably transmit a control message to at least part of the personal network PN to switch from the first to the second personal network security mode. For example, the control message can be transmitted directly to the control unit C, or be transmitted to another part of the personal network PN to be automatically relayed to the control unit C.

The control message can comprise various types of control messages, and the control unit C can be configured to be controlled by those various types of messages. For example, a suitable control message can contain one or more message elements such as user identification information, a user name, data and/or place of birth of the user, a login code, a password, a pincode, one or more voice or spoken commands, a suitable combination of the afore-mentioned elements and/or a different message. For example, the control message can contain an indication to identify the at least one personal device 1, 2, 3, 4, which device is to restricted to have access to the personal network PN during the second personal network security mode. Herein, the mentioned identification can also identify a group of personal devices, for example—in the present case—a stolen network vehicle part V that includes respective personal vehicle relates devices 2.

For example, in a non-limiting embodiment, a control message can be a command "block my car" to command the control unit C to deny personal vehicle network parts 2 or the respective vehicle network domain V any further access to the personal network PN. In another non-limiting example, the message can be a command "block my network" or "stop personal network" to command the control unit C, to deny any access to the personal network for any of the personal devices 1, 2, 3, 4.

For example, the control message can be transmitted to at least part of the personal network PN using an external communication network that is connected to that part of the personal network, wherein the communication network preferably is a telephone network.

In a user-friendly embodiment, the control message can be transmitted to a particular network address, for example a telephone number that is associated with the user of the personal network (such as a home telephone number). Particularly, the telephone number is associated with at least one telephone device 1*a* that is part of the personal network PN. The control message can include user spoken words that can be recognized by part of the personal network (for example the control unit and/or telephone device 1*a*) in the case that the respective personal network part is configured to carry out a suitable voice recognition process. The control message can also include an SMS (Short Message Service) or MMS (Multimedia Messaging Service) message, or a message of another suitable format, in which case the control unit is arranged to receive such a (SMS/MMS) message and to carry out the above-described steps (i.e., changing a respective security mode) depending on the content of the received (SMS/MMS) message.

Therefore, the personal network PN can be secured in a safe and simple manner, and the user can preferably have various options to deny access to the network PN, or restrict access thereto, in the case one (or more) of the personal devices 1, 2, 3, 4 is/are lost.

According to a further embodiment, the control unit (i.e., the respective personal network security service) can provide a personal device tracking service, to track a personal device that has been lost. For example, the control unit can be configured to stay in touch with a personal device that has been lost (i.e., to maintain a communication connection with that device), to obtain certain information from the device that has been lost. For example, the control unit can be configured to monitor any operations that are carried out by the lost personal device, and/or to request and receive status information from the lost device. In a non-limiting embodiment, the mentioned operations to be monitored can involve user interface operations regarding a user interface of the lost device (if such user interface is present), communications that are being carried out be the lost device, or communications that the lost device tries to set up (such as the setting up of a telephone call).

Also, in an embodiment, the control unit C can be configured to deactivate any personal device that has been reported lost or stolen (via a suitable control message), for example by transmitting a suitable deactivation message to the respective personal device that has been lost.

Although the illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims.

It is to be understood that in the present application, the term "comprising" does not exclude other elements or steps. Also, each of the terms "a" and "an" does not exclude a plurality. Also, a single processor or other unit may fulfill functions of several means recited in the claims. Besides, one or more functions recited in the claims can be fulfilled by hardware, software, and a combination of hardware and software. For example, the personal network control unit can be embedded at least partly in software, and/or can be a personal network security service. Also, any reference sign(s) in the claims shall not be construed as limiting the scope of the claims.

For example, there can be provided various control unit modes and network security modes, for example at least a first mode, second mode, and optionally further control unit security modes (i.e., personal network security modes).

The invention claimed is:

1. A personal network, being associated with a user, the personal network comprising:
   a plurality of personal devices within the personal network and associated with the user, the personal devices being configurable, via one or more communication connections, to allow seamless data communication between them; and
   a personal network control unit or service configured to control access of the plurality of personal devices to the personal network, wherein the control unit is operable in a first mode to allow each of the personal devices to access both the personal network and each of the other personal devices, and in a second mode to preclude the access of at least one of the personal devices to both the personal network and each of the other personal devices.

2. The personal network recited in claim 1 wherein the personal network control unit or service comprises a gateway device, or can be reached via a gateway device, the gateway device being configured to provide access to the personal network via an external communication network.

3. The personal network recited in claim 1 wherein the control unit or service is configured to receive a control message from the user and, in response to the control message, change from the first mode to the second mode.

4. The personal network recited in claim 3 wherein the control unit or service is connected to an external communication network such that the control message can be transmitted, via the external network, to the unit or service.

5. The personal network recited in claim 4 wherein the external network is a telephone network.

6. The personal network recited in claim 4 wherein the external network is a wide area network.

7. The personal network recited in claim 1 wherein one of the personal devices is selected from the group consisting of:
   a personal device being part of a personal area network that is spatially associated with the user during its operation;
   a personal device that is located in a building that is associated with the user; and
   at least part of a personal transport apparatus that is associated with the user.

8. The personal network recited in claim 1 wherein the personal network control unit includes a service for provisioning the access control of the plurality of personal devices.

9. A method of securing a personal network associated with a user comprising:
   allowing access to the personal network by a plurality of personal devices associated with the user and being configurable, via one or more communication connections, to allow seamless data communicatione between them;
   providing a first mode in which each of the personal devices are allowed to access both the personal network and each of the other personal devices; and
   providing a second mode, in which at least one of the personal devices is precluded access to both the personal network and each of the other personal devices.

10. The method recited in claim 9 further comprising the step of transmitting a control message to a part of the personal network to switch from the first to the second modes.

11. The method recited in claim 10 wherein the control message is transmitted to the part of the personal network via an external communication network connected to the part of the personal network.

12. The method recited in claim 11 wherein the communication network is a telephone network.

13. The method recited in claim 10 wherein the control message contains an indication to identify the one personal device which is to have restricted access to the personal network during the second personal network security mode.

14. The method recited in claim 9 wherein the personal network is a personalized network overlay having multiple network domains.

15. The method recited in claim 14 wherein the network overlay. comprises a private or public infrastructure.

16. The method recited in claim 15 wherein the network overlay further comprises a security service to provide the first and second modes.

17. The method of claim 9 further comprising associating the plurality of personal devices configured for inter-device communication with the personal network for providing the first and second modes.

18. A non-transitory computer readable storage media having computer readable instructions stored thereon, wherein the instructions, when executed by a processor, so as to cause the processor to perform the steps recited in claim 9.

* * * * *